US007192248B2

(12) United States Patent
Helvey et al.

(10) Patent No.: US 7,192,248 B2
(45) Date of Patent: Mar. 20, 2007

(54) HIGH SPEED MACHINING DEVICE

(75) Inventors: Amy M. Helvey, Imperial, MO (US); Keith A. Young, St. Peters, MO (US); Jiri Tlusty, deceased, late of Gainesville, FL (US); by Hana Tlusty, legal representative, Palm Coast, FL (US); Kevin Waymack, Hazelwood, MO (US)

(73) Assignee: The Boeing Company, Chicago, IL (US)

( * ) Notice: Subject to any disclaimer, the term of this patent is extended or adjusted under 35 U.S.C. 154(b) by 68 days.

(21) Appl. No.: 10/843,087

(22) Filed: May 11, 2004

(65) Prior Publication Data

US 2005/0254937 A1 Nov. 17, 2005

(51) Int. Cl.
*F01D 1/04* (2006.01)
(52) U.S. Cl. .................................. 415/202; 415/904
(58) Field of Classification Search ................ 415/151, 415/199.4, 199.5, 202, 216.1, 904
See application file for complete search history.

(56) References Cited

U.S. PATENT DOCUMENTS

| 1,864,019 | A | * | 6/1932 | Hoffman | 415/111 |
| 1,864,027 | A | * | 6/1932 | Pedersen | 415/91 |
| 2,732,671 | A | * | 1/1956 | McFadden | 451/359 |
| 3,386,702 | A | * | 6/1968 | Krzyszczuk | 415/123 |
| 3,709,630 | A |  | 1/1973 | Pohl et al. |  |
| 4,776,752 | A |  | 10/1988 | Davis |  |

FOREIGN PATENT DOCUMENTS

| GB | 718 028 | 11/1954 |
| GB | 1 169 873 | 11/1969 |
| GB | 1 401 137 | 7/1975 |
| GB | 1 457 839 | 12/1976 |

OTHER PUBLICATIONS

Macro Technologies, Incorporated publication entitled High Speed Air Spindle printed from http://www.macrotechnologies.com/spec_high_speed_air_spindle.htm, Nov. 6, 2000.
E L Tool Corporation publication entitled Radial Machining in Confined Areas—A New Technology Solution printed from http://www.eltool.com/aps.html, Nov. 22, 2000.
Air Turbine Tools® Application publication, pp. 7-10, vol. 2, No. 2.
International Search Report from European Patent Office in connection with the International application No. PCT/US2005/015523 dated Aug. 5, 2005.

* cited by examiner

*Primary Examiner*—Edward K. Look
*Assistant Examiner*—Devin Hanan
(74) *Attorney, Agent, or Firm*—Senniger Powers

(57) ABSTRACT

An air turbine driven rotary machine tool having a tool casing, a turbine rotor mounted within the casing for rotation, a stator mounted in fixed position in the tool casing coaxially aligned with the turbine rotor, a annular cavity defined within the casing and coaxially aligned with the stator and rotor for supplying air to the stator blades, a cylindrical spindle coaxially mounted with the turbine rotor in the tool casing for rotation with the turbine rotor, and a tool holder mounted coaxially to the spindle for rotation therewith and having an end thereof for operably receiving a cutting tool.

19 Claims, 6 Drawing Sheets

STATOR　　ROTOR

HIGH SPEED MACHINING DEVICE

FIELD OF THE INVENTION

The present invention is related to the field of machining, and more particularly, to high speed machining tools.

BACKGROUND OF THE INVENTION

There currently exist several turbine driven rotary machine tools for various operations. Some of these tools are bulky and operate at a relatively low speed and high horsepower. These tools can use large cutting bits for removing substantial amounts of material from a work piece. There exists other turbine driven rotor machine tools that are relatively less bulky and operate at a relatively high speed with small cutting bits to remove lesser amounts of material at a relatively high rate.

As a matter of example, currently, complex aerospace parts containing T-stiffners and return flanges that carry around corners of a pocket are designed as sheet metal attachments or machined with a low speed rotary machine tool having a right angle head. The sheet metal requires additional fasteners, which in turn increase the part weight, part count, cost and assembly time. Low speed machining with current right angle head designs requires additional machining time and access to confined areas is limited by the bulkiness of the head. Features on the peripheral part or features in ribs are currently machined by hand, with additional setup and complex tooling, or with a low speed right angle head. This requires more setup time, machining time, and increases tooling costs. The bulkiness of current right angle heads limits their capability.

There therefore exists a need for a relatively high speed, high horsepower turbine driven rotary machine tool that can utilize relatively large bits to remove substantial amounts of material at high speed.

SUMMARY OF THE INVENTION

Embodiments of the present invention can overcome the above-described difficulties and disadvantages of prior art air turbine driven rotary machine tools by providing such a tool that is relatively small so that it can be utilized in smaller spaces, can run at relatively high speeds with relatively high horsepower and utilize a machining bit which is relatively large so as to remove substantial amounts of material at high speed and is thus both cost and time effective.

In a preferred embodiment of the present invention, there is provided an air turbine driven rotary machine tool, comprising: a tool casing; a turbine rotor mounted within the casing for rotation about a rotational axis, the turbine rotor having a plurality of blades equally spaced about the rotational axis; a stator mounted in fixed position in the tool casing coaxially aligned with the rotational axis of the turbine rotor and having a plurality of equally spaced stator blades operatively aligned with the rotor blades; an annular cavity defined within the casing and coaxially aligned with the stator and rotor and having an annular open end adjacent the stator blades for supplying air to the stator blades; a cylindrical spindle coaxially mounted with the turbine rotor in the tool casing for rotation with the turbine rotor; and a bit holder mounted coaxially to the spindle for rotation therewith having an end thereof for operably receiving a bit therein for rotation therewith.

In addition, there is also preferably provided a pressurized air supply source in communication with the annular cavity for supplying air under pressure to the stator and rotor blades. An aspect of the preferred embodiment also preferably includes a tool support secured to the tool casing and providing a path for pressurized air from the air supply source, the tool support being disposed at substantially a right angle to the tool casing and having a valve for controlling the air flow from the air supply source so as to control the speed of rotation of the spindle.

In a further aspect the preferred embodiment there is included an annular exhaust cavity defined within the casing and coaxially aligned with an output of the rotor and a plurality of exhaust openings defined in the casing in communication with the annular exhaust cavity.

The features, functions, and advantages can be achieved independently in various embodiments of the present inventions or may be combined in yet other embodiments. Other aspects and features will be in part apparent and in part pointed out hereinafter.

BRIEF DESCRIPTION OF THE DRAWINGS

Figure 1:
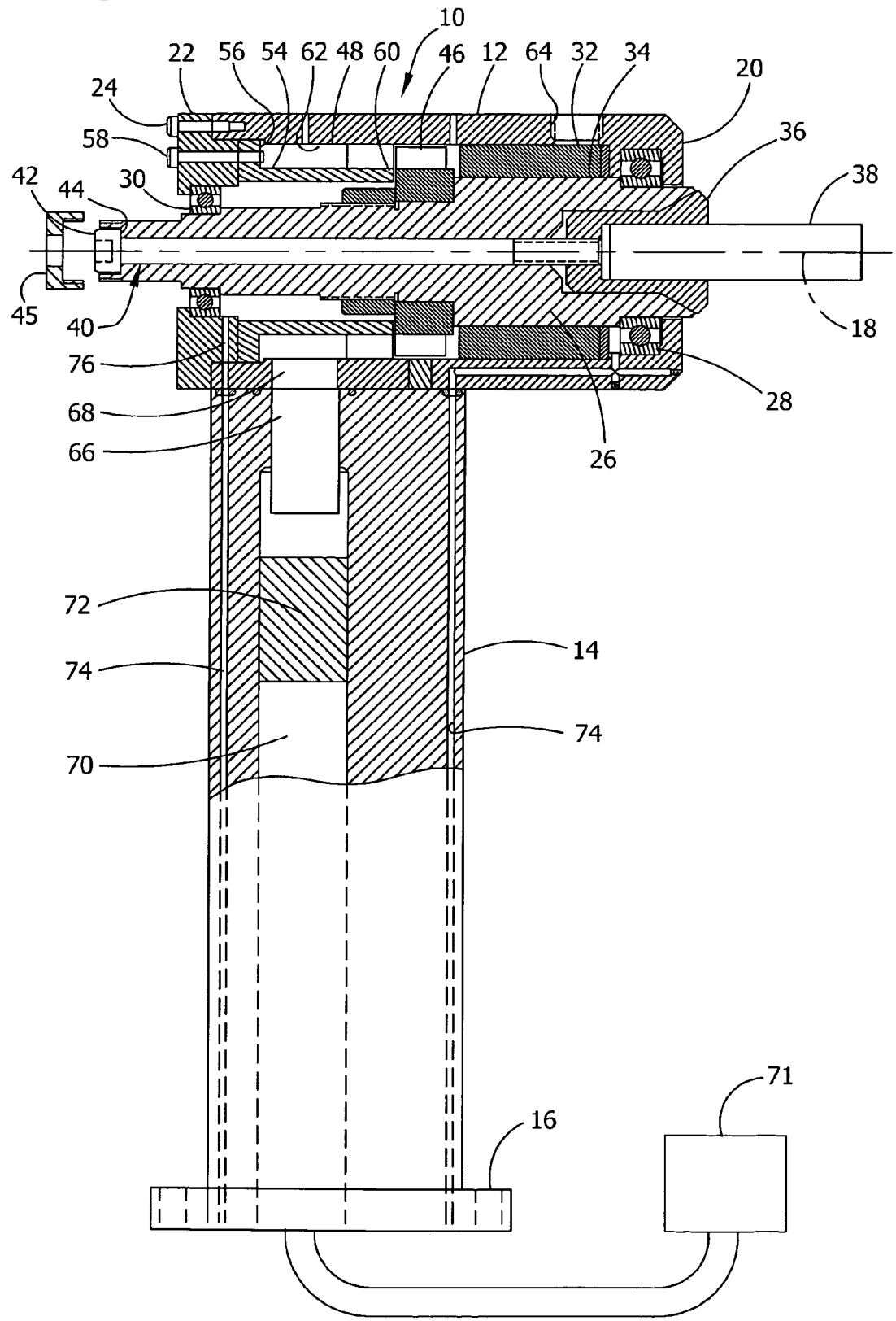
Figure 2:
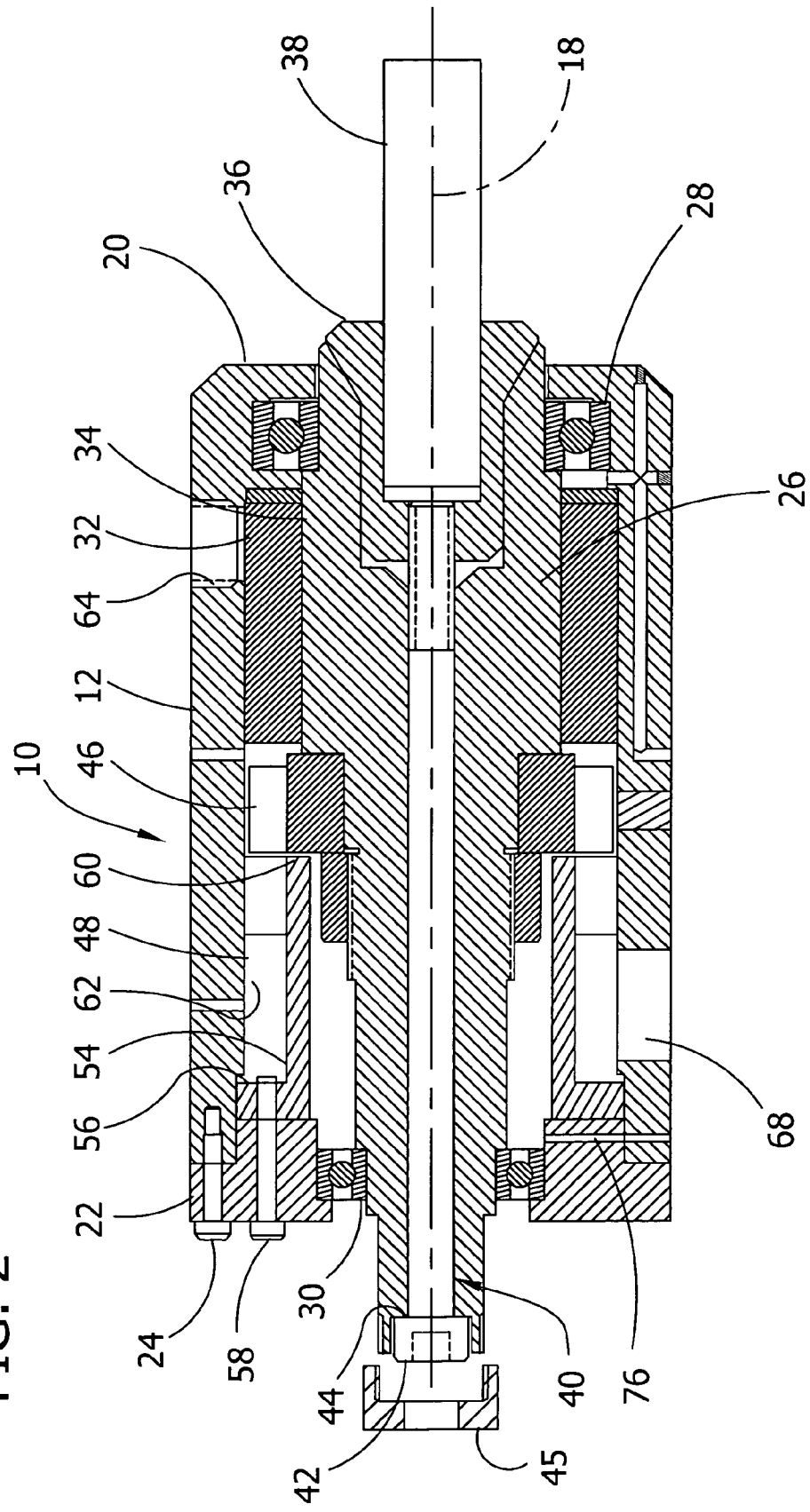
Figure 3:
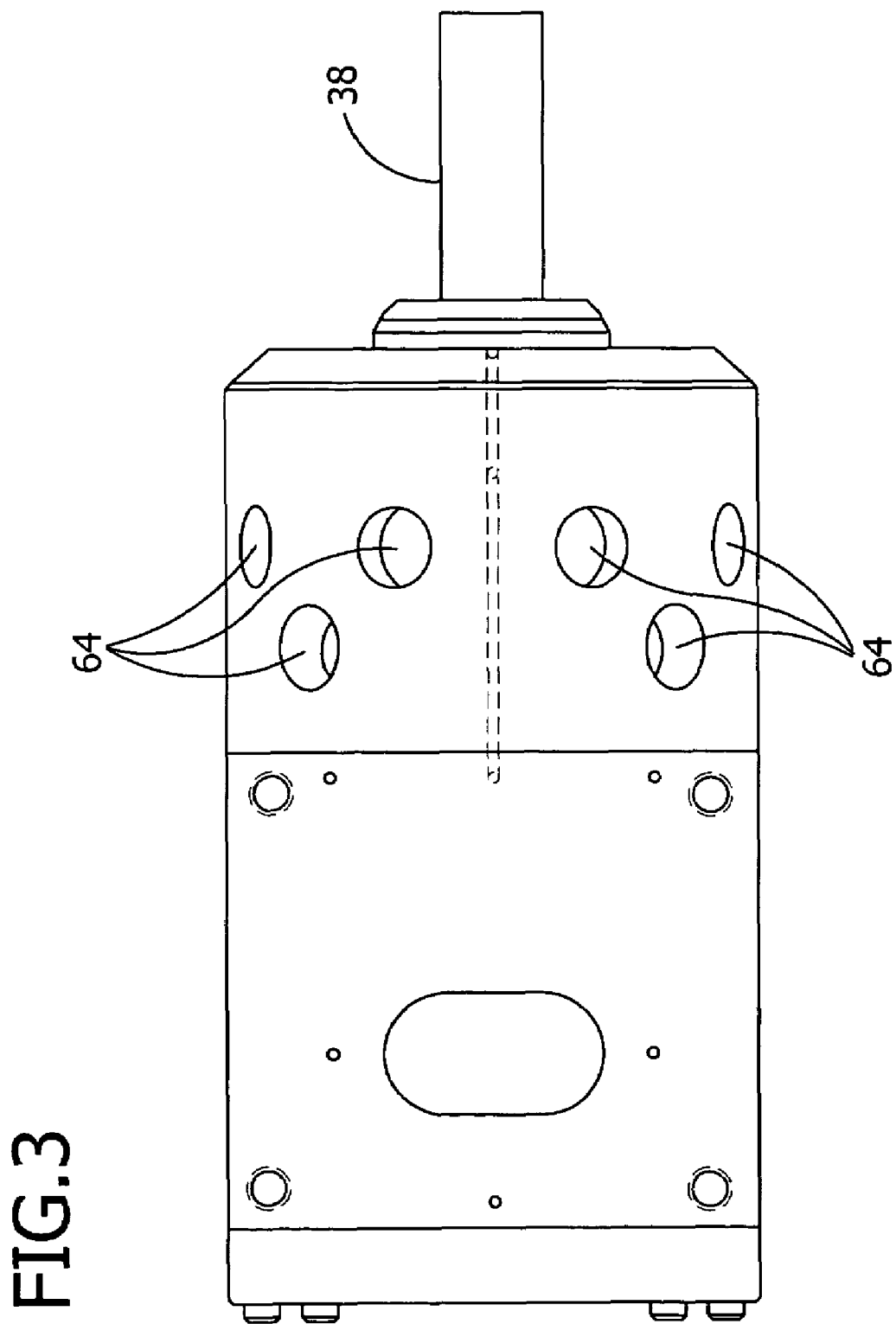
Figure 4:
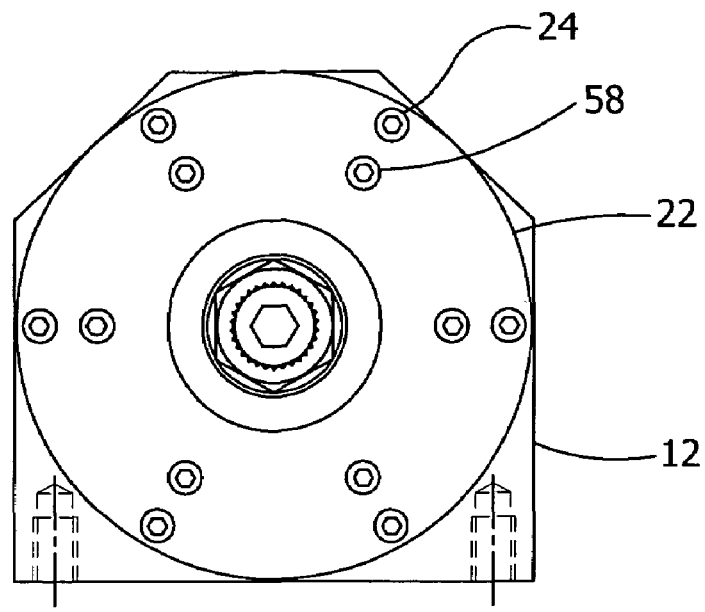
Figure 5:
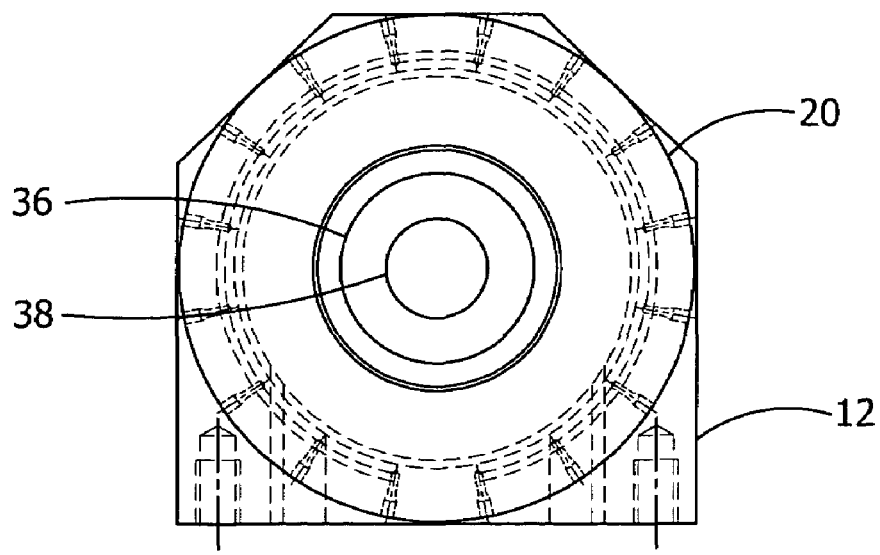
Figure 6:
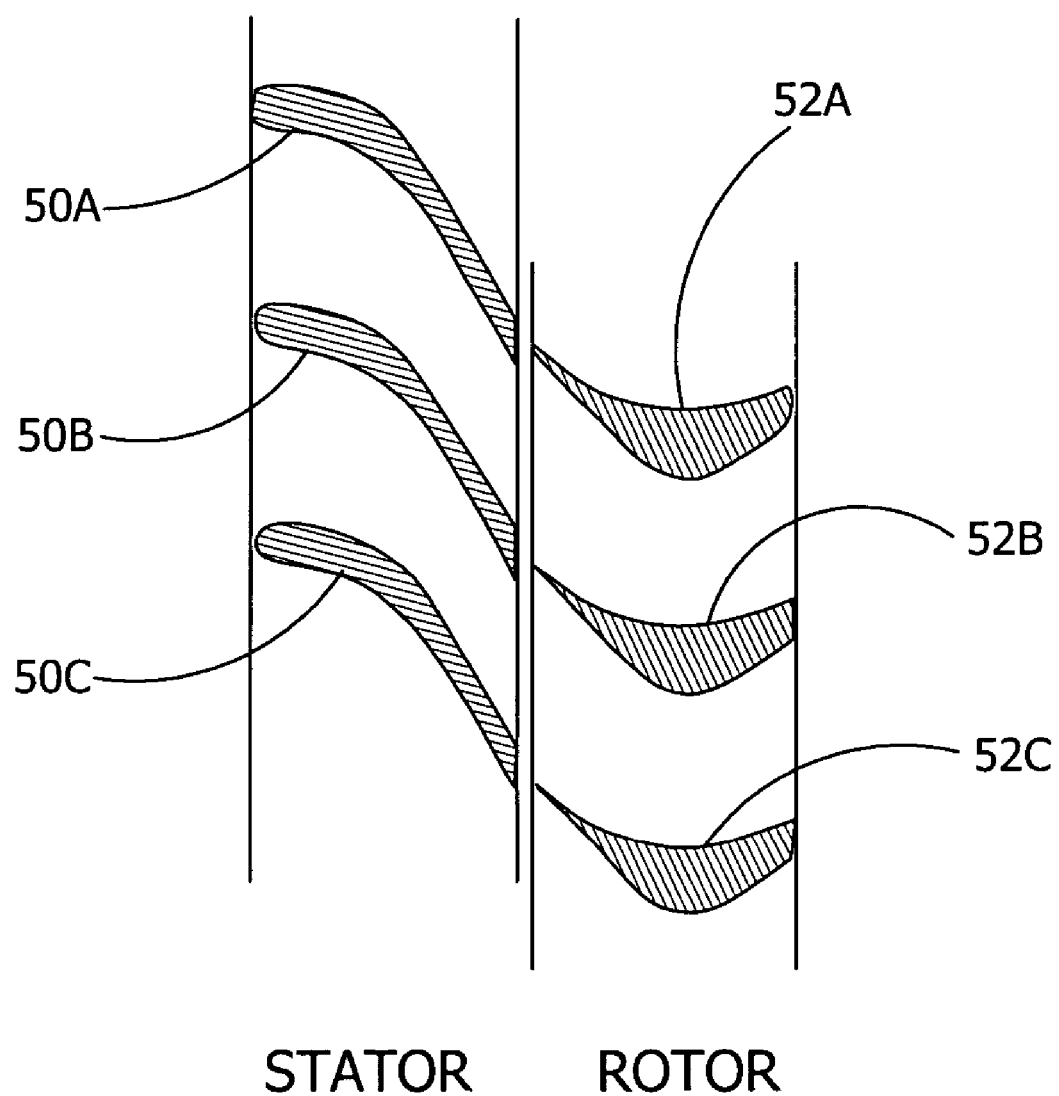
Figure 7:
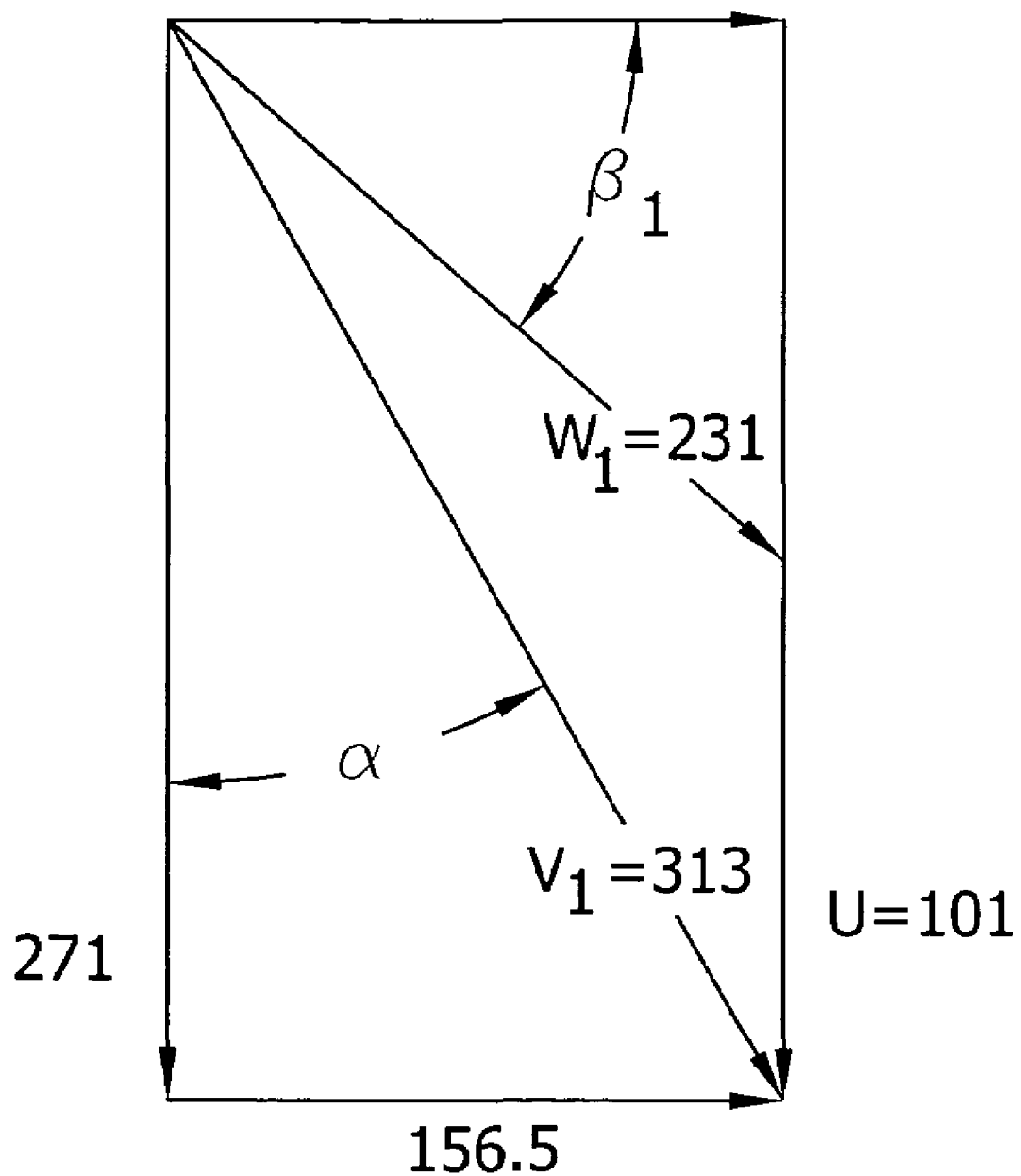

Having thus described the invention in general terms, reference will now be made to the accompanying drawings wherein:

FIG. 1 is a partial cross-sectional view of a preferred embodiment of the turbine driven machine tool of the present invention;

FIG. 2 is a cross-sectional view of the upper portion of the machine tool of FIG. 1;

FIG. 3 is a top plan view of the machine tool of FIG. 1;

FIG. 4 is a rear view of an upper portion of the machine tool of FIG. 3;

FIG. 5 is a front view of the upper portion of the machine tool of FIG. 3;

FIG. 6 is a schematic view of several stator and rotor blades in cross-section and in alignment of the preferred embodiment of the present invention; and FIG. 7 is a vector diagram for air exiting from the stator for a specific example.

Corresponding reference characters indicate corresponding parts throughout the drawings.

DETAILED DESCRIPTION OF THE PREFERRED EMBODIMENT

A preferred embodiment of the turbine driven rotary machine tool, designated generally as 10, is shown in partial cross-section in FIG. 1. Machine tool 10 has a tool casing 12 of generally cylindrical form and which contains the main operating parts of the machine tool. A tool support 14 is secured to the tool casing 12 so that the machine tool 10 can be attached to a machine tool spindle (not shown) at its outer end 16 for being moved into position relative to a work piece and for making cuts on the work piece in a well known manner.

Tool casing 12 is generally cylindrical and has a central longitudinal axis 18 and a closed front end 20 formed as part of the tool casing. A rear cap 22 is bolted to the opposite end of tool casing 12 by a series of bolts 24. Mounted within the tool casing 12 is a spindle 26 which is supported in the front end of the casing by bearing 28 and in the rear cap by bearing 30. An additional cylindrical ceramic bearing 32 is mounted in the tool casing 12 and engages and supports the cylindrical surface 34 of spindle 26 for rotation. Spindle 26 is provided with a cylindrical tool holder 36 of generally conventional construction which is somewhat bell-shaped with a series of longitudinal extending slots which allows the outer end of the tool holder to be compressed axially to grip a tool 38. Tool holder 36 is attached at its rear end to the threaded end of bolt 40, the head 42 of which is received on a cylindrical shoulder 44 formed in the end of spindle 26 which thus allows the bolt 40 to be rotated to draw the tool holder 36 into the end of the spindle 26 and thus tighten around the tool 38. An end cap 45 is threaded to the end of spindle 26 covering the head 42 of bolt 40. Tool 38 is any conventional cutting bit, milling head or drill, or other tool, which can be utilized for cutting material.

Mounted to the central region of the spindle 26 for rotation therewith is a turbine rotor 46 which includes a series of turbine blades uniformly spaced around the circumference of the spindle 26. In FIGS. 1 and 2 the blades are not individually shown, and the turbine rotor 46 is depicted as a block. Mounted in a fixed position in the tool casing 12 is a turbine stator 48, which in FIG. 1 is depicted as a block, but which would contain a series of uniformly spaced stator blades 50 (see FIG. 6) positioned in operative alignment with turbine rotor blades 52 on turbine rotor 46. A schematic example of the relative positioning of the stator and rotor blades is illustrated in FIG. 6 where a series of equally circumferentially spaced stator blades 50A, 50B and 50C are disposed adjacent equally circumferentially spaced rotor blades 52A, 52B and 52C where the longitudinal axis 18 of the spindle 26 (not shown in FIG. 8) would extend laterally from left to right.

Referring again to FIG. 1, an internal cylindrical wall 54 having a cylindrical flange 56 is mounted to the rear cap 22 by a series of bolts 58. The cylindrical wall 54 extends into the tool casing 12 so that its innermost end 60 is disposed adjacent the turbine rotor 46. The stator blades of turbine stator 48 are disposed between the cylindrical wall 54 and an inner wall 62 of tool casing 12. The inner wall 62 of tool casing 12 and the outside surface of cylindrical wall 54 thus form an annular cavity within the tool casing which is coaxial lined with the stator and rotor 46 and 48. The annular cavity has an open end adjacent the turbine stator 48. The annular cavity is connected to a source of air under pressure, as described more fully below, to supply air to the stator 48 which, in turn, supplies air to turn the rotor 46.

In the forward portion of tool casing 12 a series of holes 64 (see FIG. 3) are drilled or otherwise formed in the casing in the area of the porous cylindrical ceramic bearing 32. Holes 64 provide an exit for the exhaust air from the turbine rotor 46 to escape the casing 12 after passing through the porous ceramic bearing 32.

The cylindrical tool support 14 is mounted to the tool casing 12 and has an opening 66 aligned with a corresponding opening 68 in the tool casing and which communicates with the annular cavity formed between the inner wall 62 of tool casing 12 and cylindrical wall 54. A high pressure air supply passageway 70 is formed in tool support 14 which is, in turn, connectable to a remote high pressure air supply 71, shown schematically in FIG. 1, for supplying air under pressure to the tool. A valve 72 shown schematically in FIG. 1 positioned in the air supply passageway 70 is used to control the air supply and thus control the rotational speed of the turbine rotor 46 and spindle 26. Valve 72 is preferably an electro-pneumatic valve which can be controlled in response to spindle speed determinations based on sensors (not shown) positioned in the tool casing to sense the rotational speed of the spindle, although other valves and control systems can be utilized.

Also formed in the tool support 14 and in tool casing 12 are a series of channels 74 and 76 which supply an air/oil mist to bearings 28 and 30.

Because of the high speed (45,000 RPM) and high horsepower (10 HP) desired for this tool in some situations, the use of a single stage axial turbine is preferred. As an example of such a design, as shown in FIG. 7, the absolute velocity at the exit from the stator blades 48 is chosen as $V_1$=313 m/sec, at 49 psi and the temperature of the air stream T=244 deg. K (Kelvin)=0.29 deg. C. (Celsius) and the exit angle $\alpha$=30° from the stator blades 48 is also chosen. Choosing the mean diameter of the rotor 46 d=45 mm giving a peripheral speed at 45,000 rpm of U=101 m/sec. This determines the angle of the relative velocity into the rotor of $\beta_1$=47.4° which gives an entrance velocity into the rotor ($W_1$) of 231 m/sec. With an assumed zero reaction turbine the exit angle from the rotor blade 46 will be 32.8°. Choosing 45 mm as the mean diameter of the blades 46 and their height as 5 mm, the frontal area of $A_f$=6.75×10$^{-4}$ m$^2$. The corresponding root diameter of the blades is thus 40 mm and the outer diameter is 50 mm. With the angle $\alpha$=30° of the absolute air speed at the exit from the stator blades 48 the effective exit area is $A_{eff}$=3.38×10$^{-4}$ m$^2$ and the air flow is 0.106 m$^3$/sec. At 49 psi exit pressure the density of the air is 4.7 kg/m$^3$ and the mass flow (dm/dt) is 0.498 kg/sec. The power generated will be U×$V_1$×cos 30°×dm/dt=13,634 $W_1$=18.13 HP at 100% efficiency which would not be the case in an actual design but would provide the desired speed and horsepower stated above.

The potential problems of over speeding and that of stall are resolved by preferably using an electro-pneumatic flow control valve 72, as discussed above, the valve is controlled from a speed sensor that, for example, counts the frequency of rotor blade passing. The valve 72 opening and closing will keep the speed within limits and prevent overspeeding. If the load increases close to stall, as soon as the speed drops below a set value such as, e.g. 80% of nominal, the speed sensor signal will cause feed stop.

Sensors (not shown) of temperature and pressure in the chambers both upstream and downstream of the stator and the rotor can also be used to control the operation of valve 72 to help in the proper adjustment of the performance of the spindle 26.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. An air turbine driven rotary machine tool, comprising:
a tool casing;
a turbine rotor mounted within the casing for rotation about a rotational axis, the turbine rotor having a plurality of blades equally spaced about the rotational axis;
a stator mounted in fixed position upstream of said turbine rotor in the tool casing coaxially aligned with the rotational axis of the turbine rotor and having a plurality of equally spaced stator blades operatively aligned with the rotor blades;
an annular cavity defined within the casing and coaxially aligned with the stator and rotor and having an annular open end adjacent the stator blades for supplying air to the stator blades;
a spindle coaxially mounted with the turbine rotor in the tool casing for rotation with the turbine rotor; and a tool holder mounted coaxially to the spindle for rotation therewith having an end thereof for operably receiving a bit therein for rotation therewith.

2. The tool of claim 1, including a tool support secured to the tool casing and providing a path for pressurized air from an air supply source, the tool support being disposed at substantially a right angle to the tool casing.

3. The tool of claim 2, including the spindle being supported by bearings mounted in the casing at front and rear portions of the spindle and paths formed in the spindle and tool support for supplying an air/oil mist to the bearings.

4. The tool of claim 2, including a valve for controlling the air flow from the air supply source so as to control the speed of rotation of the spindle.

5. The tool of claim 1, including a annular exhaust cavity defined within the casing and coaxially aligned with an output of the rotor.

6. The tool of claim 5 including the casing having a plurality of exhaust openings defined therein in communication with the annular exhaust cavity.

7. The tool of claim 1, including a pressurized air supply source in communication with the annular cavity for supplying air under pressure to the stator and rotor blades.

8. The tool of claim 1 wherein the stator blades have an exit angle of approximately 30 degrees.

9. The tool of claim 8 wherein the rotor blades have an exit angle of approximately 32.8 degrees.

10. The tool of claim 9 wherein the maximum rotor speed is approximately 45,000 rpm.

11. A machine tool, comprising:
    a tool casing;
    a spindle mounted in the tool casing for rotation about a longitudinally extending rotational axis thereof;
    the spindle including a turbine rotor having a plurality of blades equally spaced about the rotational axis;
    a stator mounted in fixed position upstream of said turbine rotor in the tool casing coaxially aligned with the rotational axis of the spindle and having a plurality of circumferentially spaced stator blades operatively aligned with the rotor blades;
    a first annular cavity defined within the casing aligned with the stator and rotor and having an open end adjacent the stator blades for supplying air to the stator blades;
    a second annular cavity defined within the casing aligned with an output of the rotor to form an exhaust path for air coming from the rotor;
    a tool support secured to the tool casing and providing a path for pressurized air from an air supply source, the tool support being disposed at substantially a right angle to the tool casing;
    a valve for controlling the air flow from the air supply source so as to control the speed of rotation of the spindle: and
    a tool holder mounted coaxially to the spindle for rotation therewith and for operably receiving a tool therein for rotation therewith.

12. A method of fabricating an air turbine driven rotary machine tool, the method comprising:
    providing a tool casing:
    providing a turbine rotor mounted within the casing for rotation about a rotational axis, the turbine rotor having a plurality of blades equally spaced about the rotational axis:
    providing a stator mounted in fixed position upstream of said turbine rotor in the tool casing coaxially aligned with the rotational axis of the turbine rotor and having a plurality of equally spaced stator blades operatively aligned with the rotor blades;
    providing an annular cavity defined within the casing and coaxially aligned with the stator and rotor and having an annular open end adjacent the stator blades for supplying air to the stator blades;
    providing a spindle coaxially mounted with the turbine rotor in the tool casing for rotation with the turbine rotor; and
    providing a tool holder mounted coaxially to the spindle for rotation therewith having an end thereof for operably receiving a bit therein for rotation therewith.

13. The method of claim 12, including providing a tool support secured to the tool casing and providing a path for pressurized air from an air supply source, the tool support being disposed at substantially a right angle to the tool casing.

14. The method of claim 13, including supporting the spindle with bearings mounted in the casing at front and rear portions of the spindle and forming paths in the spindle and tool support for supplying an air/oil mist to the bearings.

15. The method of claim 12, including providing a valve for controlling the air flow from the air supply source so as to control the speed of rotation of the spindle.

16. The method of claim 12, including providing an annular exhaust cavity defined within the casing and coaxially aligned with an output of the rotor.

17. The method of claim 13 including providing the casing with a plurality of exhaust openings defined therein in communication with the annular exhaust cavity.

18. The method of claim 12, including providing a pressurized air supply source in communication with the annular cavity for supplying air under pressure to the stator and rotor blades.

19. A method of fabricating a machine tool, the method comprising:
    providing a tool casing;
    providing a spindle mounted in the tool casing for rotation about a longitudinally extending rotational axis thereof;
    providing the spindle with a turbine rotor having a plurality of blades equally spaced about the rotational axis;
    providing a stator mounted in fixed position upstream of said turbine rotor in the tool casing coaxially aligned with the rotational axis of the spindle and having a plurality of circumferentially spaced stator blades operatively aligned with the rotor blades;
    providing a first annular cavity defined within the casing aligned with the stator and rotor and having an open end adjacent the stator blades for supplying air to the stator blades;
    providing a second annular cavity defined within the casing aligned with an output of the rotor to form an exhaust path for air coming from the rotor; providing a tool support secured to the tool casing and providing a path for pressurized air from an air supply source, the tool support being disposed at substantially a right angle to the tool casing;
    providing a valve for controlling the air flow from the air supply source so as to control the speed of rotation of the spindle; and
    providing a tool holder mounted coaxially to the spindle for rotation therewith and for operably receiving a tool therein for rotation therewith.

* * * * *